3,211,091
PRINTING PLATE AND PROCESS FOR
MAKING SAME
Russell U. Garrett, Box 644, R.R. 1, Augusta, Mich.
Filed July 30, 1962, Ser. No. 213,446
4 Claims. (Cl. 101—401.1)

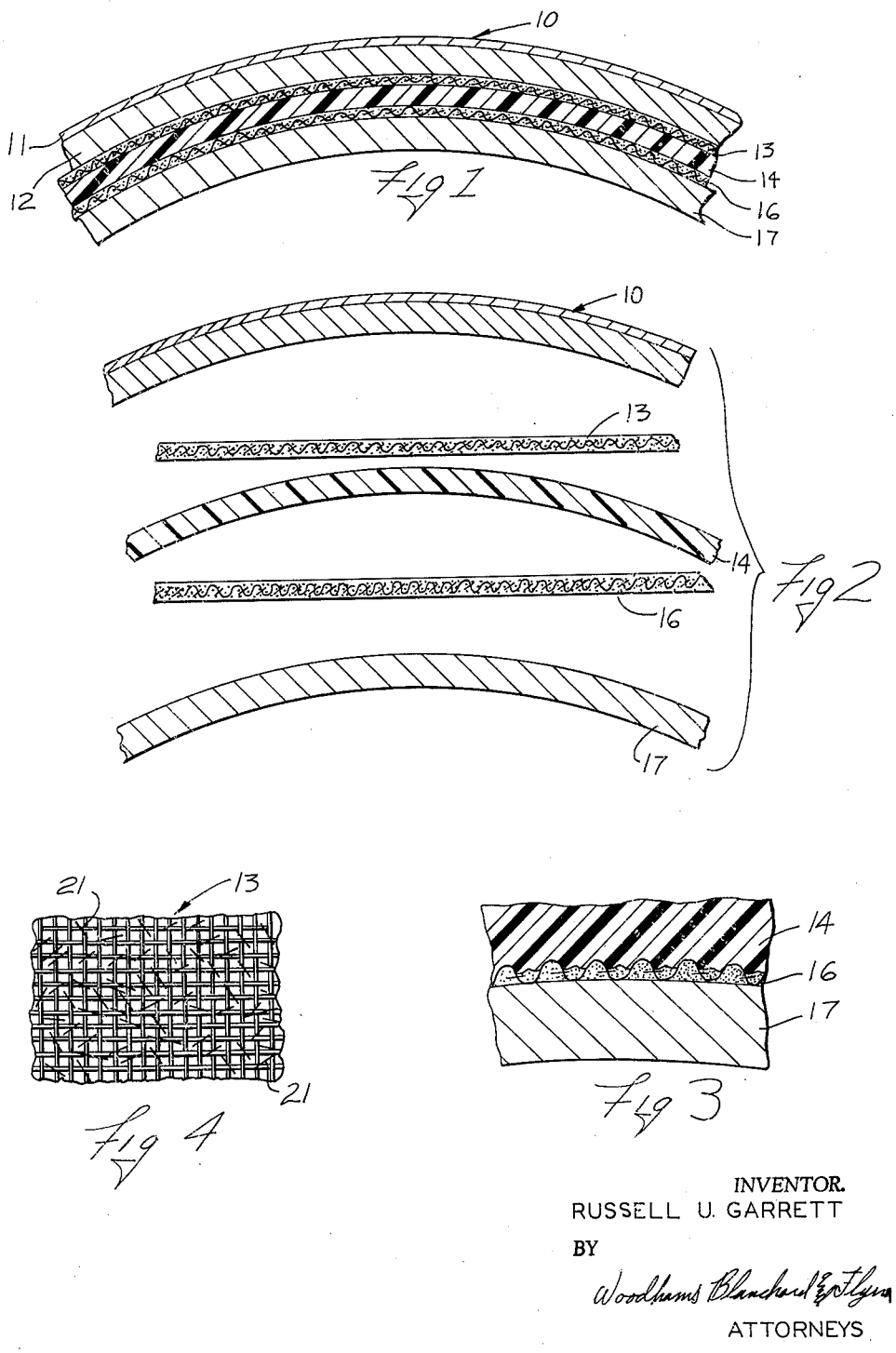

This application is a continuation-in-part of my application Serial No. 203,965, filed June 20, 1962, now abandoned.

This invention relates in general to an improved, plastic-backed printing plate and a process for making same and, more particularly, relates to the use of a moldable, supported and adhesive film for bonding the laminae of a plastic-backed printing plate to each other to form an integral unit.

Plastic-backed printing plates are comprised of a printing shell, a plastic intermediate layer and a metal, such as aluminum, backing sheet, all of which are bonded together to form an integral unit. In the present, commercial procedure for making such plates, the back of the printing shell, both sides of the plastic backing layer and the front of the metal backing plate are painted, brush coated, or sprayed with a suitable adhesive, which adhesive usually is dissolved in a solvent. These components are then assembled in a stack and placed into a suitable laminating press. Heat and pressure are applied to soften the plastic backing layer and force it down into the voids and irregular contours in the back of the printing shell. The heat and pressure also cure the adhesive and thereby effect bonding of the laminae to each other. The pressure also levels the face of the plate.

It is difficult at best to provide a uniform coating of adhesive on the laminae by a painting, spraying or brush-coating operation. Perhaps if sufficient care is taken an acceptably uniform coating can be applied on the surfaces of the plastic backing layer and the metal backing plate because they are relatively smooth surfaced, but an acceptably uniform coating cannot be applied on the back of a printing shell, such as an electrotype shell, because it has an irregular surface. The difficulty of applying a uniform coating of adhesive on the laminae has detrimentally affected the quality of the resulting printing plate. For example, the back of the printing shell may have voids therein which could be completely filled with adhesive so that it would be very difficult to dry same. In order to form an acceptable bond, it is necessary that the adhesive be completely dry (solvent free) before the bonding operation is carried out. If it is not completely dry, solvent will be trapped between the laminae and this will cause a weak bond of the laminae or no bond at all. The areas where solvent is trapped also will be soft and spongy and afford little or no support for the printing shell. This will produce what is known in the trade as a "soft face" on the laminated printing plate and a plate having such a face is not commercially acceptable.

In an existing modification of the above process the plastic backing layer, the printing shell and the metal backing plate are coated with adhesive as above. However, when the laminated plate is assembled, a piece of dry cheesecloth is placed between the printing shell and the plastic backing layer. It is believed that the cheesecloth is intended to provide avenues of escape for any solvent remaining in the adhesive. The strands of the cheesecloth could, however, after the bonding operation is completed, present avenues of entrance of solvents and oils during the printing processes. Thus, the cheesecloth can act as a wick whereby solvents and oils can be drawn into the bond line and weaken the bond causing delamination of the printing plate.

Therefore, it will be apparent that prior procedures for making laminated plastic-backed printing plates are less than completely satisfactory because of bond failures either during the manufacturing procedure or during use of the plate.

Accordingly, it is an object of this invention to provide an improved, laminated, plastic-backed printing plate and a process for making same.

It is a further object of this invention to provide an improved, laminated printing plate and a process for making same, as aforesaid, in which an improved, uniform and long-lasting bond between the laminae is achieved.

It is a further object of this invention to provide an improved printing plate and process for making same, as aforesaid, which at least minimizes, if not entirely eliminates, the problems heretofore encountered with improper drying of the adhesive.

Other objects and advantages of the invention will become apparent to persons acquainted with printing plates of this type upon reading the following specification and examining the accompanying drawings.

In the drawings:

FIGURE 1 is a sectional view of a laminated printing plate embodying the invention, the plate shown being a plate for a rotary printing press and the section being taken transversely of the axis of curvature of the plate.

FIGURE 2 is an exploded view of the plate shown in FIGURE 1.

FIGURE 3 is an enlarged view of a fragment of FIGURE 1.

FIGURE 4 is a plan view of a fragment of the moldable, supported, adhesive film used for laminating the printing plate.

Referring to the drawings, the laminated printing plate which has been selected for the purpose of illustrating the invention is comprised of a printing shell 10, a moldable, supported, adhesive film 13, a plastic intermediate layer 14, another moldable, supported, adhesive film 16 and a metal backing sheet 17, all of which are bonded together to form a unitary printing plate. The printing shell 10 can be of any suitable type and is here shown as being an electrotype having a base layer 11, which commonly is made of nickel, and a backing layer 12, which commonly is made of copper. The printing shell 10 can be of any suitable type and can be formed in accordance with well-understood, conventional techniques and, hence, does not require further description. The metal backing sheet 17 also is conventional and consists, for example, of a smooth-surfaced or perforated sheet of metal, such as aluminum. Where a perforated backing sheet 17 is used, the film 16 may not be necessary and can be eliminated. The printing shell 10, the backing sheet 17 and the plastic layer 14 are shape retaining at room temperature and, therefore, they are preshaped before they are laminated with each other and with the films 13 and 16.

The plastic layer 14 is a sheet of suitable plastic composition. Compositions for this purpose are well known to the trade and, hence, do not require detailed description. However, examples of suitable compositions used for the purpose are vinyl acetate-vinyl chloride copolymers and vinyl chloride vinylidene chloride coplymers. The layer 14 is of uniform thickness and is imperforate and smooth-surfaced.

The films 13 and 16 are identical and, hence, a description of one will suffice for both thereof. The film 13 is comprised of a porous fabric of a heat-softenable, plastic material. The thermal softening temperature of the fabric should approximate the thermal softening temperature of the plastic of which the layer 14 is made and the thermal softening temperatures of both must be within the temperature cure range of the adhesive used as described further hereinbelow. Fabrics comprised of such plastics as nylon, polyester resins (Dacron) and acrylonitrile resins (Orlon) are especially satisfactory although other plastic materials meeting the above-stated requirements will also be acceptable. The individual strands of the fabric preferably are composed of one or more monofilaments.

The fabric is coated with a suitable adhesive capable of bonding the printing shell 10 and the backing sheet 17, both of which are of metal, to the plastic intermediate layer 14. The adhesive preferably is of the heat-softenable type. It is applied to the fabric in any convenient way so that the fabric is uniformly coated on both sides and is impregnated with the adhesive and the resulting film 13 is of uniform thickness. A preferred way of coating the fabric is shown in my Patent No. 3,015,268. Adhesives suitable for this purpose are well known and, therefore, need not be described in detail. Such adhesives are commercially available in the form of a solution of the adhesive in a volatile solvent. Thus, in applying the adhesive to the fabric the adhesive-solvent solution is coated on the fabric and then the solvent is evaporated so that the adhesive forms a dry coating of uniform thickness on the fabric.

It is advantageous, but not essential, to incorporate into the adhesive-solvent solution with which the fabric is coated, a quantity of short, glass fibers so that such fibers are deposited in a random fashion on the fabric along with the adhesive. These fibers are indicated at 21 in FIGURE 4. The use of such glass fibers has been found to improve the strength of the bond between the laminae.

The fabric should be of sufficiently open mesh or weave that the adhesive when in a fluid condition can migrate freely therethrough while the plastic layer 14 cannot move to any substantial extent through the interstices thereof. It has been found that fabrics comprised of strands from about .001 to about .0004 inch in diameter and having a space between adjacent strands of from about .001 to about .004 inch are satisfactory for the purposes of the invention although other fabric weaves meeting the above-stated requirements also would be satisfactory. A fabric having strands of .001 inch in diameter and a spacing of about .002 inch between adjacent strands has been found to be especially satisfactory. The adhesive coating on the fabric is such that the dry caliper of the adhesive coated fabric preferably is from about .002 to about .003 inch greater than that of the uncoated fabric.

In the laminating operation, the metal backing sheet 17, the film 16, the plastic layer 14, the film 13 and the printing layer 10 are arranged in a stack in the above-stated order and are placed in a laminating press of any conventional type. In most cases, it is desirable to heat this assemblage for a few minutes, e.g., 3 minutes, to a temperature of, for example, 250 degrees F. under a light pressure to assure intimate contact of the laminae. The adhesive may soften and become somewhat flowable at this time. However, surface tension and the strands of the fabric will maintain the adhesive in place so that uniform adhesive layers are provided over all of the areas to be bonded. This is one of the important advantages of the invention, because prior art techniques frequently caused substantial flow of adhesive which resulted in some areas starved for adhesive and other areas of heavy adhesive concentration. Such caused weak bonds in adhesive-starved areas while a weak, spongy bond was created in areas of heavy-adhesive concentration.

The pressure is then increased, usually to a value of about 80 pounds per square inch, and the temperature is increased to about 330 degrees F. At this time, the plastic layer 14, the adhesive and the fabric are all in a softened condition, the plastic layer and the fabric being moldable but not freely flowable and the adhesive being in a freely flowable liquid condition. This plastic layer 14 is pressed against the fabrics and to some extent it is pressed into the fabrics but it does not pass through the fabrics to any substantial extent. Thus, there is created a mechanical interlock between the plastic layer 14 and the fabrics. This is shown in FIGURE 3. Moreover, since the fabric is heat softened, it can mold very easily and, therefore, it will be forced into the irregularities or voids in the back of the printing layer and will conform substantially to the shape thereof. While there may be some flow of adhesive along the bond line between the fabric and the shell 10 and along the bond line between the fabric and the layer 14, such flow will be minor because it is hindered by the fabric and, therefore, a substantially uniform layer of adhesive will be present between one side of the fabric and the printing layer and between the other side of the fabric and the plastic layer. Some flow of adhesive through the fabric may occur. However, this will be minor in amount. Thus, the adhesive will be more uniformly distributed than was possible heretofore and a more uniform bond will be achieved.

A similar action occurs between the film 16 and the backing sheet 17 and the opposite surface of the plastic sheet 14. After the bonding operation is completed, the one-piece printing plate is removed from the press, and is further processed if necessary. It then can be used for printing purposes in a substantially conventional fashion.

A modification of this procedure which will achieve some but not all of the objects of the invention involves the spraying or brushing of adhesive on the surfaces to be bonded and then drying same. An uncoated, heat-softenable fabric is then placed between such surfaces and the laminating operation is carried out as before. This will provide a more uniform distribution of adhesive between the laminae than do the prior art processes but it will be less uniform than is provided by the preferred embodiment of the invention.

Although particular preferred embodiments of the invention have been disclosed, it will be understood that variations or modifications of such disclosure which lie within the scope of the appended claims are fully contemplated.

What is claimed is:
1. A laminated printing plate, comprising:
   a metallic printing shell having a generally irregular inner surface;
   a rigid backing sheet;
   an intermediate plastic sheet positioned between said printing shell and said backing sheet, said plastic sheet being softenable at a relatively low heat so that when heated it can conform substantially to the shape of the surfaces it contacts;
   the back surface of said intermediate plastic sheet being bonded to the front surface of said rigid backing sheet;
   an adhesive film means between the inner surface of said printing shell and the opposed surface of said intermediate plastic sheet, said film means including a woven fabric of a plastic material softenable to bonding condition at a relatively low heat, said woven fabric being impregnated with and embedded in a heat softenable adhesive to form a sheet of substantially uniform thickness, said woven fabric further including means for providing free migration of said adhesive therethrough when said adhesive is in softened condition but for preventing migration therethrough of the plastic of said intermediate sheet when said intermediate plastic sheet has been softened by heat, said means being in the form of mesh openings;
   said fabric, said adhesive and said intermediate plastic sheet all being heat softenable at similar relatively low temperatures, said adhesive tightly bonding the laminations of said printing plate to form a unitary structure, said woven fabric conforming and being tightly bonded to the generally irregular inner surface of said printing shell, and said intermediate plastic sheet being mechanically bonded to said woven fabric.

2. A liminated printing plate as set forth in claim 1, wherein the woven fabric of said adhesive film means is formed of strands of between about .0004 and .001 inch in diameter and the spacing between adjacent strands is between about .001 and .004 inch.

3. A laminated printing plate as set forth in claim 1, in which said adhesive film means has relatively short, glass fibers adhered thereto and randomly distributed thereon.

4. A laminated printing plate as set forth in claim 1, wherein a second, identical adhesive film means forms the bond between the back face of said intermediate plastic sheet and the front face of said rigid backing sheet.

References Cited by the Examiner
UNITED STATES PATENTS

| | | | |
|---|---|---|---|
| 2,577,205 | 12/51 | Myer et al. | 156—276 |
| 2,800,856 | 7/57 | Myers | 101—401.1 |
| 3,015,268 | 1/62 | Garrett | 101—401.1 |

FOREIGN PATENTS

| | | |
|---|---|---|
| 1,111,815 | 7/61 | Germany. |
| 621,867 | 4/49 | Great Britain. |

ROBERT E. PULFREY, *Primary Examiner.*

EUGENE R. CAPOZIO, *Examiner.*